(12) United States Patent
Mate et al.

(10) Patent No.: US 12,356,105 B2
(45) Date of Patent: Jul. 8, 2025

(54) SESSION DESCRIPTION FOR COMMUNICATION SESSION

(71) Applicant: Nokia Technologies Oy, Espoo (FI)

(72) Inventors: Sujeet Mate, Tampere (FI); Saba Ahsan, Espoo (FI); Igor Curcio, Tampere (FI)

(73) Assignee: Nokia Technologies Oy, Espoo (FI)

( * ) Notice: Subject to any disclaimer, the term of this patent is extended or adjusted under 35 U.S.C. 154(b) by 256 days.

(21) Appl. No.: 17/919,613

(22) PCT Filed: Apr. 1, 2021

(86) PCT No.: PCT/FI2021/050246
§ 371 (c)(1),
(2) Date: Oct. 18, 2022

(87) PCT Pub. No.: WO2021/214379
PCT Pub. Date: Oct. 28, 2021

(65) Prior Publication Data
US 2023/0119757 A1 Apr. 20, 2023

(30) Foreign Application Priority Data

Apr. 22, 2020 (FI) ..................................... 20205407

(51) Int. Cl.
*H04N 5/272* (2006.01)
*H04L 65/61* (2022.01)

(52) U.S. Cl.
CPC ............. *H04N 5/272* (2013.01); *H04L 65/61* (2022.05)

(58) Field of Classification Search
CPC ...... H04N 5/272; H04N 7/157; H04N 13/194; H04N 13/243; H04N 13/302; H04N 13/344; H04N 21/21805; H04N 65/403; H04N 13/117; H04N 13/161; H04N 13/366; H04N 7/15; H04L 65/61; H04L 65/612
See application file for complete search history.

(56) References Cited

U.S. PATENT DOCUMENTS

2019/0379884 A1* 12/2019 Oh ..................... H04N 19/167

FOREIGN PATENT DOCUMENTS

WO    WO 2019229304    *  5/2019    ......... H04N 21/4728

OTHER PUBLICATIONS

Intel et al., "ITT4RT Permanent Document-Requirements, Working Assumptions and Potential Solutions," 3GPP TSG-SA4 Meeting #108e, S4-200650, Online Meeting, Apr. 6-9, 2020.

(Continued)

*Primary Examiner* — Yosef K Laekemariam
(74) *Attorney, Agent, or Firm* — McCarter & English LLP

(57) ABSTRACT

There is provided generating, at a control device of a media communication session between participant devices, a session description for the communication session, the session description including media stream identifiers and at least one element including an arrangement of the media stream identifiers indicating a background media stream and associated one or more overlay media streams, and sending, by the control device, the session description to the participant devices for indicating the participant devices to associate the background media stream with one or more overlay media streams for rendering a scene with at least three degrees of freedom.

14 Claims, 10 Drawing Sheets

(56) References Cited

OTHER PUBLICATIONS

3GPP TS 26.114 v16.5.0, $3^{rd}$ Generation Partnership Project; Technical Specification Group Services and System Aspects; IP Multimedia Subsystem (IMS); Multimedia Telephony; Media handling and interaction (Release 16), Mar. 2020.
Intel, "ITT4RT: Potential Solution for Overlays," 3GPP TSG-SA4 Meeting #107, S4-200264, Wroclaw, Poland, Jan. 20-24, 2020.
3GPP TR 26.928 V2.0.0, 3rd Generation Partnership Project; Technical Specification Group Services and System Aspects; Extended Reality (XR) in 5G (Release 16), Mar. 2020.

* cited by examiner

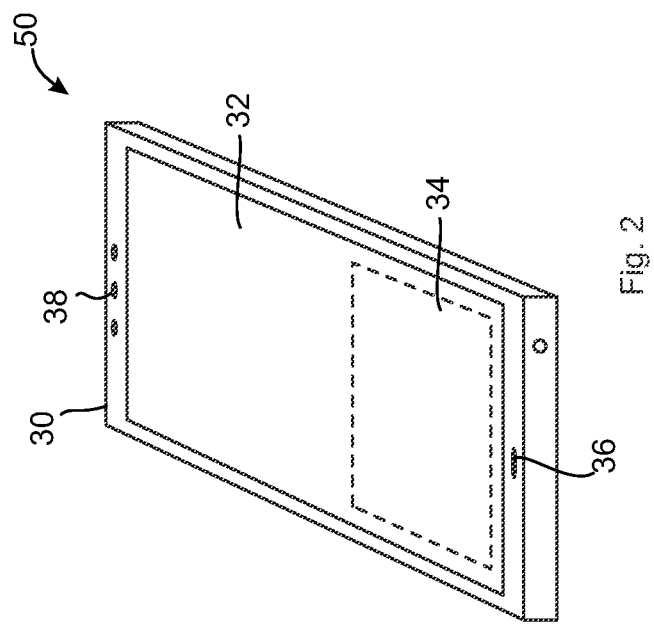
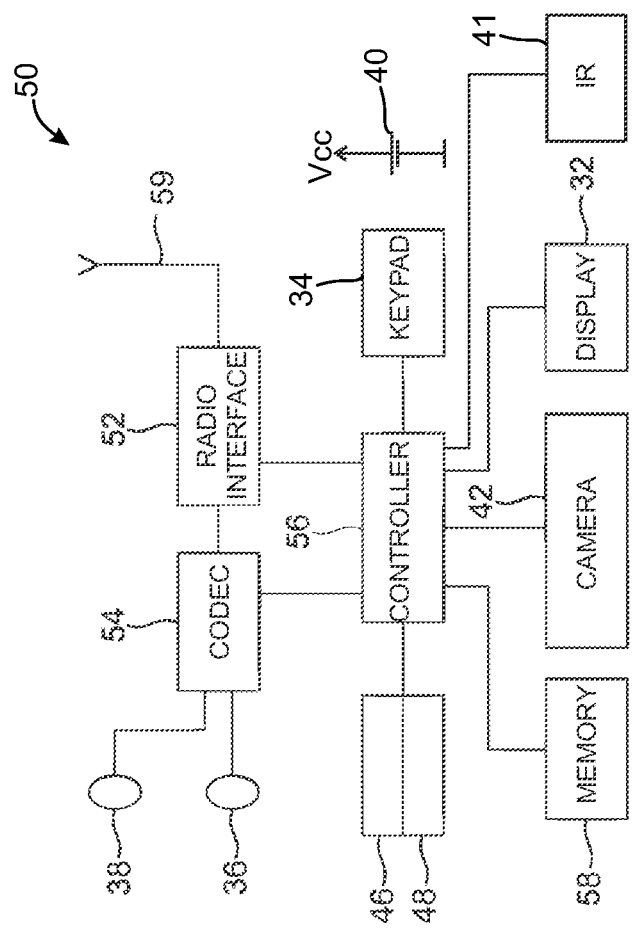

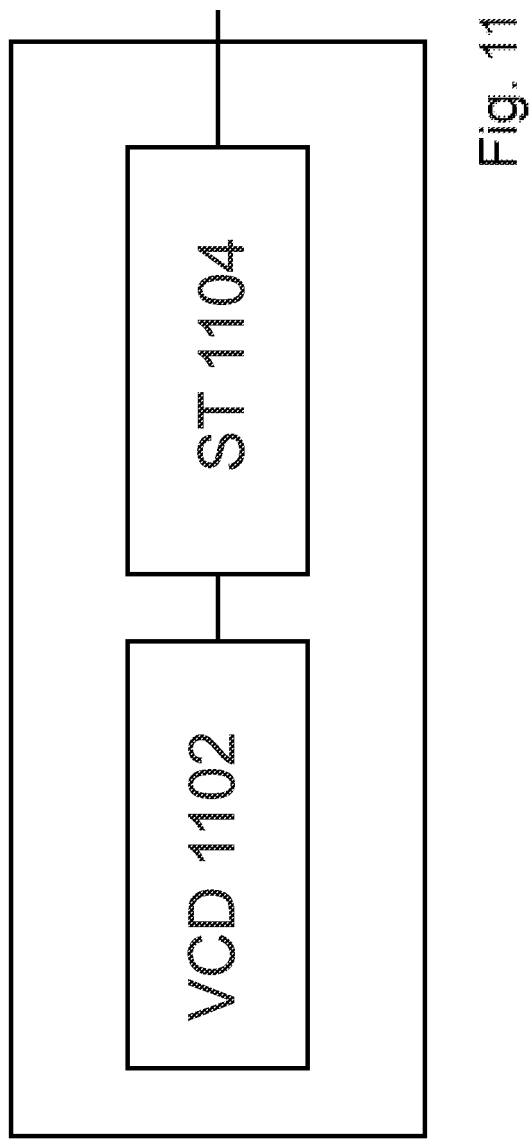

SESSION DESCRIPTION FOR COMMUNICATION SESSION

CROSS REFERENCE TO RELATED APPLICATION

This patent application is a U.S. National Stage application of International Patent Application Number PCT/FI2021/050246 filed Apr. 1, 2021, which is hereby incorporated by reference in its entirety, and claims priority to FI 20205407 filed Apr. 22, 2020.

TECHNICAL FIELD

The present invention relates to a session description for a communication session.

BACKGROUND

This section is intended to provide a background or context to the invention that is recited in the claims. The description herein may include concepts that could be pursued but are not necessarily ones that have been previously conceived or pursued. Therefore, unless otherwise indicated herein, what is described in this section is not prior art to the description and claims in this application and is not admitted to be prior art by inclusion in this section.

Media communication sessions between participants may have media streams with different characteristics. However, devices that are used by the participants may have differences in terms of their capabilities to render media streams, whereby rendering of all media streams may not be supported by the devices. Moreover, with a high number of media streams, the number of options for rendering content at a user device is high and it is possible that media streams that are incompatible with each other are rendered to the same viewport.

SUMMARY

The scope of protection sought for various embodiments of the invention is set out by the independent claims. The embodiments, examples and features, if any, described in this specification that do not fall under the scope of the independent claims are to be interpreted as examples useful for understanding various embodiments of the invention.

According some aspects, there is provided the subject matter of the independent claims. Some further aspects are defined in the dependent claims. The embodiments that do not fall under the scope of the claims are to be interpreted as examples useful for understanding the disclosure."

BRIEF DESCRIPTION OF THE DRAWINGS

For a more complete understanding of example embodiments of the present invention, reference is now made to the following descriptions taken in connection with the accompanying drawings in which:

FIG. 1 shows a block diagram of an apparatus in accordance with at least some embodiments of the present invention;

FIG. 2 shows an apparatus in accordance with at least some embodiments of the present invention;

FIG. 11 illustrates an example of a block diagram of an apparatus or a part of the apparatus in accordance with at least some embodiments of the present invention.

DETAILED DESCRIPTION OF SOME EXAMPLE EMBODIMENTS

Figure 3:
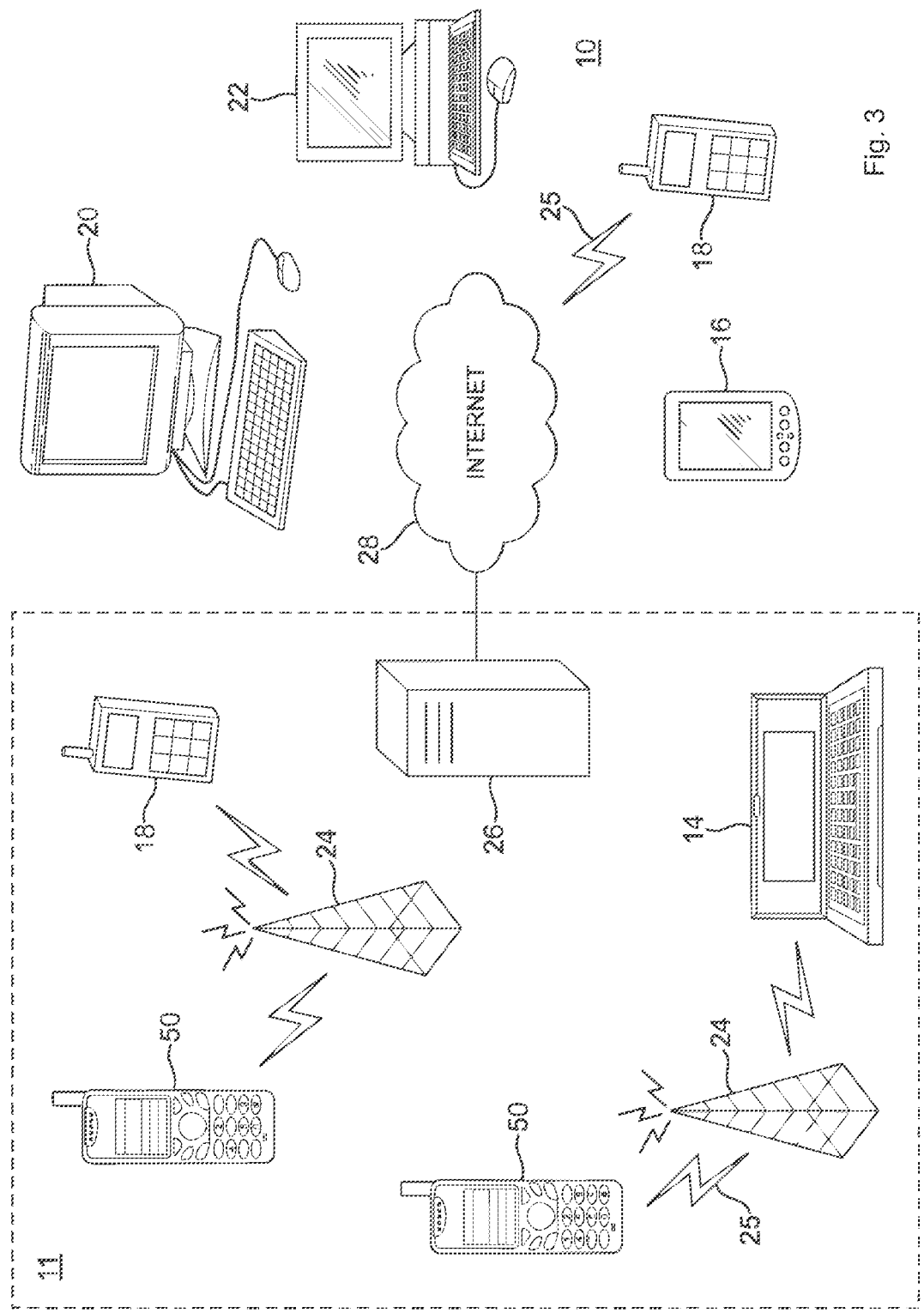
FIG. 3 shows an example of an arrangement for wireless communications comprising a plurality of apparatuses, networks and network elements.

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

In connection with a communication session involving multiple media streams for rendering a scene with three or more degrees of freedom, a session description is generated which comprises media stream identifiers and at least one element comprising an arrangement of the media stream identifiers indicating a background media stream and associated one or more overlay media streams. The session description is sent to the participant devices, whereby the participant devices are indicated a capability of having an overlay media stream associated with a background media stream for rendering a scene with at least three Degrees of Freedom (3DoF) comprising a background content and one or more associated overlay contents.

Rendering a scene with three or more Degrees of Freedom (DoF), e.g. 3DoF scene, 3DoF+ scene or a 6DoF scene, is used at least in media communication sessions that provide conversational virtual reality. The scene with at least 3DoF may also be referred to an omnidirectional scene since it provides a user an omnidirectional visual scene. Examples of conversational virtual reality comprise at least immersive or omnidirectional video conference calls. The conversational virtual reality may be useful at least in a scenario consisting of one or more conference rooms equipped with omnidirectional video capture apparatuses and one or more remote participants participating using their user devices/participant devices. Examples of user devices comprise at least Head Mounted Displays (HMDs) and Augmented Reality (AR) glasses. Examples of the omnidirectional video capture apparatuses comprise spatial capture devices, such as, 360-degree cameras and microphones. It should be appreciated in the present disclosure the terms user device and participant device are used interchangeably. Examples of the scenes comprise a 3D scene within the constraint of 3DoF scene which is a 3D (stereoscopic) or monoscopic (2D). A 6DoF scene may be rendered based on a movement of user device in a Euclidean space (x, y, z) and a rotation of the user device (yaw, pitch, roll). A 3DoF scene may be rendered based on a rotation of the user device head (yaw, pitch, roll). Stereoscopic content represents visual content to be presented differently to each eye, analogous to real world vision where the depth perception is created. Monoscopic content represents the same visual content to each eye, consequently, there is no perception of depth. Thus the 3DoF scene need not be stereoscopic. It can be a monoscopic omnidirectional content with three degrees of freedom.

Media communication session may comprise one or more devices that are configured to communicate one or more media streams between the devices. Session negotiation may be used for configuring the session at the beginning of the session and during the session. The session negotiation may be based on messaging according to a transport protocol. Examples of the transport protocols for session negotiation comprise Session Initiation Protocol/Session Description Protocol (SIP/SDP), MPEG-DASH, RTP/RTCP, ISO Base Media File Format, or any other protocol at any of the layers of the ISO OSI stack. The session may be established over an internet Protocol (IP) based connection between the devices.

Session description for a media communication session comprises media stream identifiers and one or more elements that comprise arrangements of the media stream identifiers. The media stream identifiers may comprise indicators that enable distinguishing media streams from one another within a session description of a media communication session. In an example, media stream indicators may be defined by session attributes of the session description. A session attribute defining a media stream indicator may be "a=mid: 1", where "a" indicates a session attribute and "mid: 1" indicates a media stream that has a media stream identifier (mid) "1". In an example the session description is in accordance with SDP, an SDP session description. Internet Engineering Task Force (IETF), Request for Comments: 5888, Session Description Protocol (SDP) Grouping Framework, ISSN: 2070-1721, Available on Apr. 3, 2020 https://tools.ietf.org/html/rfc5888, describes group attributes in Sections 5 and 6, which may be applied for session description in examples described herein.

Element of a session description may be a part of the session description. The element comprises a definition for controlling the session. in an example the element may be a single line of the session description. The element may comprise more than one media stream identifiers. The media stream identifiers may indicate a background media stream and associated one or more overlay media streams. The media stream identifiers may be ordered with respect to each other, whereby they form an arrangement of the media stream identifiers. The arrangement of the media stream identifiers may serve for grouping the media stream identifiers and therefore the arrangement may also be referred to a group or an ordered group of media stream identifiers. In this way relationships between the media stream identifiers may be defined and it may be determined which of the media stream identifiers indicates a background media stream and which of the media stream identifiers indicates the overlay media streams.

Background media stream may refer to a media stream that is background content to be rendered in a background of a scene. A background media stream may be originating from an omnidirectional video capture apparatus of a media communication session and/or shared by a middle box, e.g. content shared by a Multimedia Resource Function/Multipoint Control unit (MRF/MCU).

Overlay media stream may refer to a media stream that is overlay content to be rendered on top of a background content of a scene. In this way the overlay media stream is provided on the foreground with respect to a background media stream in the scene. The overlay media stream/overlay content may also be referred to a foreground media stream/foreground content. Examples of the overlay media streams comprise conversational video and/or audio. The video may be e.g. two-dimensional (2D) video, 2D rectilinear video or omnidirectional video. The omnidirectional video may be monoscopic or stereoscopic. 2D video vs 3D video and omnidirectional video vs limited field of view video are orthogonal. Omnidirectional or limited field of view video can be with or without 3D. An overlay media stream may be originating from a user device of a participant of a media communication session and/or shared by a middle box, e.g. content shared by a Multimedia Resource Function/Multipoint Control unit (MRF/MCU).

Synchronization source for rendering a scene may refer to a media stream identified by a media stream identifier in a session description of a media communication session. Participant device of a media communication session may synchronize operations with respect to the media stream serving as synchronization source. In an example, one or more other media streams identified by the session description may be synchronized with respect to the media stream serving as synchronization source. The media stream serving as synchronization source may be a background media stream or an overlay media stream. Accordingly, an element of a session description may comprise an arrangement of media stream identifiers indicating a background media stream and associated one or more overlay media streams, and one of the background media stream and overlay media streams serves for a synchronization source.

A scene with three or more DoF, e.g. 3DoF scene, 3DoF+ scene or 6Dof scene, may be rendered based on one or more media streams. The media streams may be consumed by a user via a viewport provided by a user device. It should be appreciated that consuming content e.g. a media stream may be understood to mean that a user device and its viewport enable the user to observe the content by his/her senses. Therefore, consuming content may mean at least that the content may be visually rendered and/or audible to the user via the viewport of the user device. The viewport presents the user a portion of a scene. Accordingly, the media streams may be rendered to the viewport. The portion of the scene that is consumed via the viewport may be configured on the basis of yaw, pitch, and/or roll of the user device and a position of the user device within the scene. In an example, the viewport may define a viewable area of the scene on the basis of yaw, pitch, and/or roll of the user device and a position of the user device within the scene. Examples of user devices comprise at least devices capable of rendering at least a part of a scene, such as a head-mounted display (HMD), a handheld display device or a device capable of adapting portion of the scene that is consumed via the viewport.

The following describes in further detail suitable apparatus and possible mechanisms for implementing some embodiments. In this regard reference is first made to FIG. 1 which shows a schematic block diagram of an exemplary apparatus or electronic device 50 depicted in FIG. 2, which may incorporate a transmitter according to an embodiment of the invention.

The electronic device 50 may for example be a communications device, wireless device, user device, viewer device, head-mounted-display (HMD), mobile terminal or user equipment of a wireless communication system. However, it would be appreciated that embodiments of the invention may be implemented within any electronic device or apparatus which may require transmission of radio frequency signals.

The apparatus 50 may comprise a housing 30 for incorporating and protecting the device. The apparatus 50 further may comprise a display 32 in the form of a liquid crystal display. In other embodiments of the invention the display may be any suitable display technology suitable to display an image or video. The apparatus 50 may further comprise a keypad 34. In other embodiments of the invention any suitable data or user interface mechanism may be employed. For example the user interface may be implemented as a virtual keyboard or data entry system as part of a touch-sensitive display. The apparatus may comprise one or more microphones 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery 40 (or in other embodiments of the invention the device may be powered by any suitable mobile energy device such as solar cell, fuel cell or clockwork generator). The term battery discussed in connection with the embodiments may also be one of these mobile energy devices. Further, the apparatus 50 may comprise a combination of different kinds of energy devices, for example a rechargeable battery and a solar cell. The apparatus may further comprise an infrared port 41 for short range line of sight communication to other devices. In other embodiments the apparatus 50 may further comprise any suitable short range communication solution such as for example a Bluetooth wireless connection or a USB/firewire wired connection.

The apparatus 50 may comprise a controller 56 or processor for controlling the apparatus 50. The controller 56 may be connected to memory 58 which in embodiments of the invention may store both data and/or may also store instructions for implementation on the controller 56. The controller 56 may further be connected to codec circuitry 54 suitable for carrying out coding and decoding of audio and/or video data or assisting in coding and decoding carried out by the controller 56.

In an example of the apparatus, the controller 56 may be a general purpose processor for running an operating system (OS). The controller may be for example an ARM CPU (Advanced RISC Machine Central Processing Unit). Examples of the operating systems comprise at least Android and iOS. A special purpose processor, for example a digital signal processor (DSP), may be connected to the general purpose processor and dedicated for audio processing.

The apparatus 50 may further comprise a card reader 48 and a smart card 46, for example a universal integrated circuit card (UICC) reader and UICC for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 59 connected to the radio interface circuitry 52 for transmitting radio frequency signals generated at the radio interface circuitry 52 to other apparatus(es) and for receiving radio frequency signals from other apparatus(es).

In some embodiments of the invention, the apparatus 50 comprises a camera 42 capable of recording or detecting imaging.

With respect to FIG. 3, an example of a system within which embodiments of the present invention can be utilized is shown. The system 10 comprises multiple communication devices which can communicate through one or more networks. The system 10 may comprise any combination of wired and/or wireless networks including, but not limited to a wireless cellular telephone network (such as a GSM (2G, 3G, 4G, LTE, 5G), UMTS, CDMA network etc.), a wireless local area network (WLAN) such as defined by any of the IEEE 802.x standards, a Bluetooth personal area network, an Ethernet local area network, a token ring local area network, a wide area network, and the Internet.

For example, the system shown in FIG. 3 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22, a tablet computer. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

Some or further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11, Long Term Evolution wireless communication technique (LTE), 5G and any similar wireless communication technology. Yet some other possible transmission technologies to be mentioned here are high-speed downlink packet access (HSDPA), high-speed uplink packet access (HSUPA), LTE Advanced (LTE-A) carrier aggregation dual-carrier, and all multi-carrier technologies. A communications device involved in implementing various embodiments of the present invention may communicate using various media including, but not limited to, radio, infrared, laser, cable connections, and any suitable connection. In the following some example implementations of apparatuses utilizing the present invention will be described in more detail.

Figure 4:
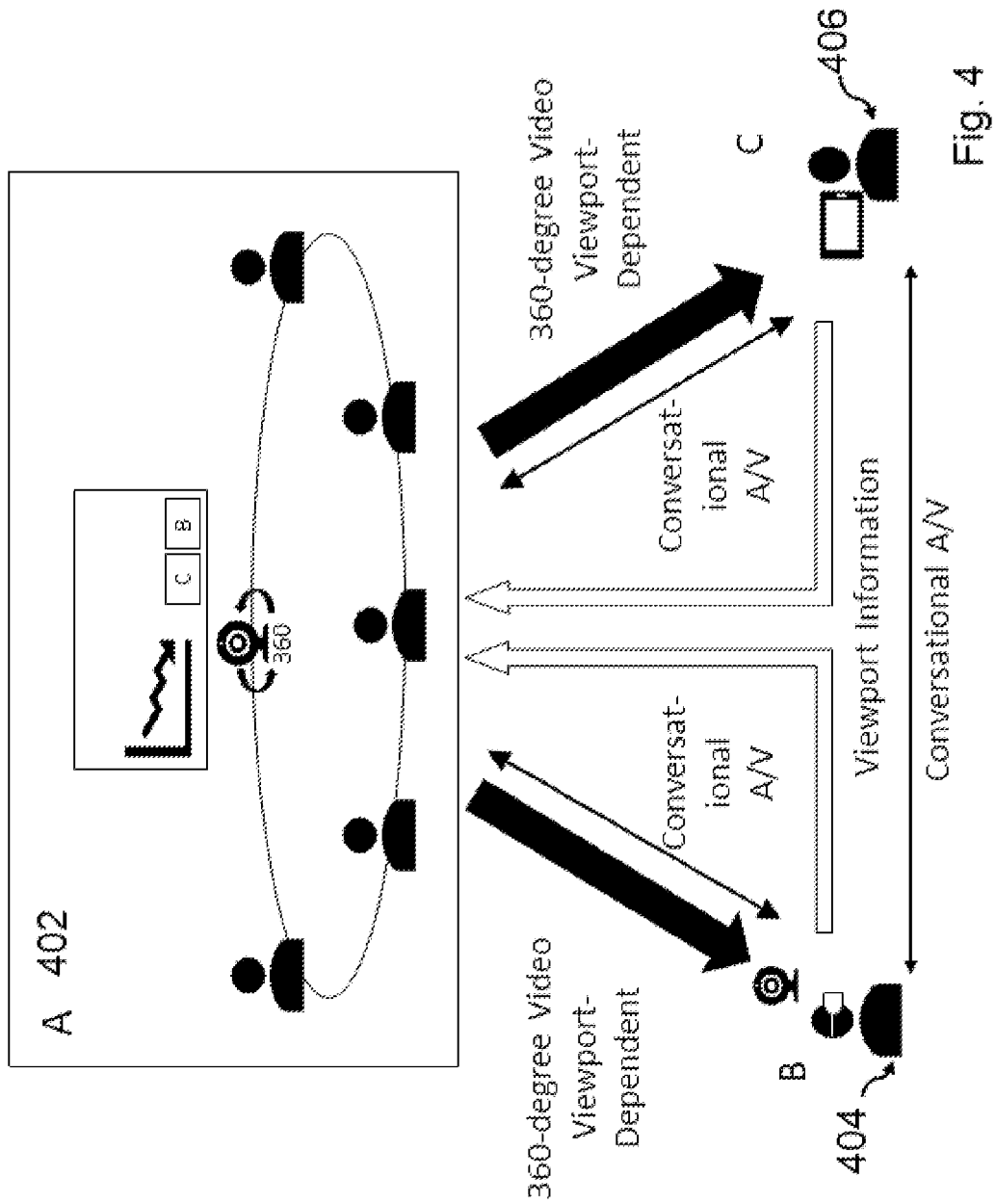
FIGS. 4 and 5 illustrate examples of media communication sessions in accordance with at least some embodiments of the present invention.
Figure 5:
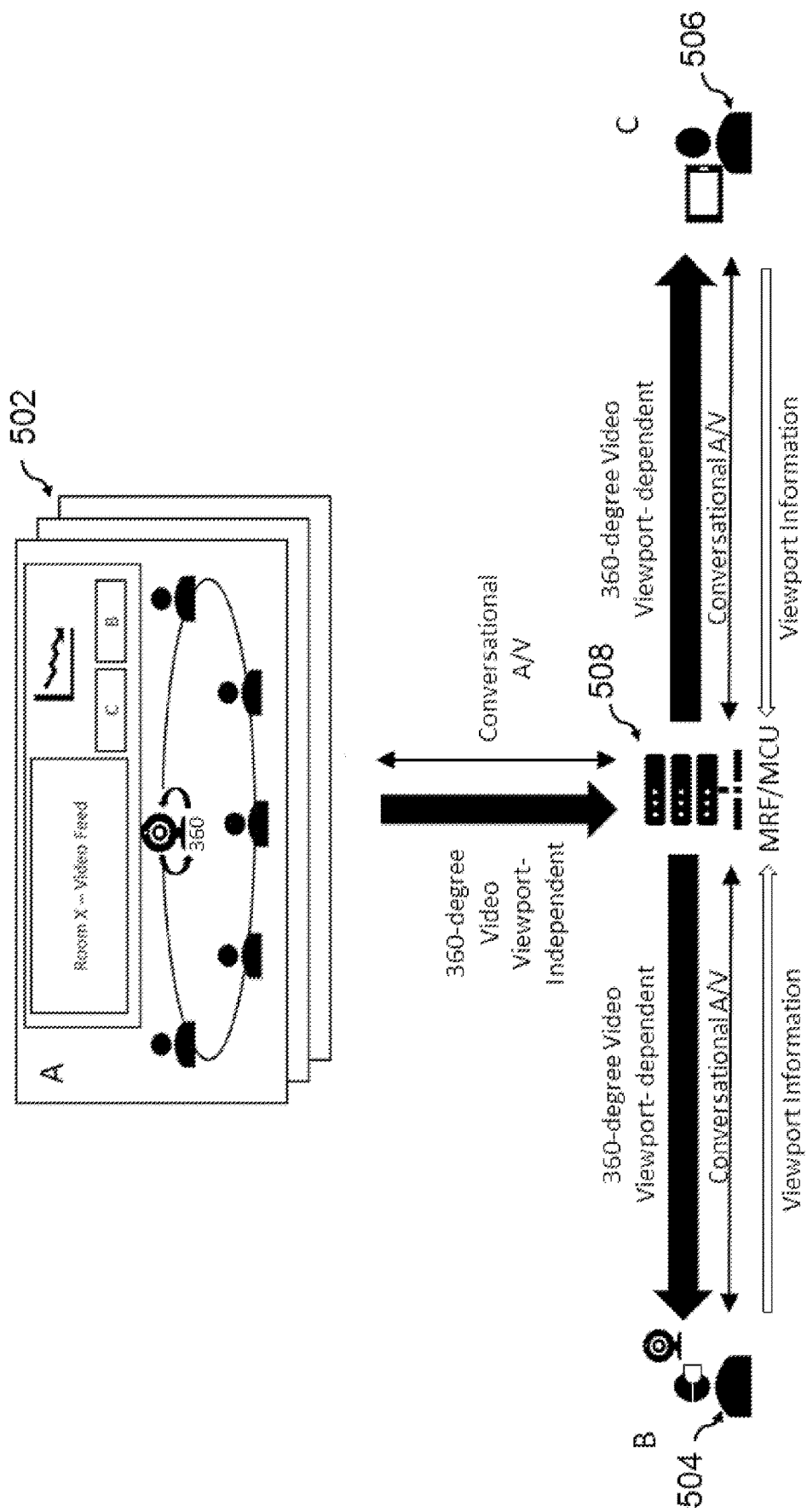

FIGS. 4 and 5 illustrate examples of media communication sessions in accordance with at least some embodiments of the present invention. A media communication session may comprise more than one media streams between that may be consumed by participants of the media communication session. Examples of the media streams comprise 360-degree video and conversational audio and/or video.

FIG. 4 illustrates a media communication session between participants that are located in a conference room 402 equipped with an omnidirectional video capture apparatus and remote participants 404, 406 who may render a scene with at least 3DoF based on 360-degree video received from the conference room.

The conference room 402 may comprise one or more user devices, for example one large display, for conversational video and/or audio of the media communication session. The remote participants 404, 406 may have user devices, for example a HMD and a 2D display device, for conversational video and/or audio of the media communication session. Viewport information is sent from the user devices of the remote participants to a source of the 360-degree content, e.g. the omnidirectional video capture apparatus or other equipment at the conference room serving as a control device, to receive viewport-dependent video from the source. The control device provides delivering the 360-degree video and conversational video and/or audio to user devices of the participants. In this way the source of the 360-degree content may send the user devices viewport dependent video streams for rendering at the user devices scenes based on a background of viewport dependent 360-degree video and an overlay of conversational video and/or audio.

FIG. 5 illustrates a media communication session between participants that are located in one or more conference rooms 502 equipped with omnidirectional video capture apparatuses and remote participants 504, 506 who may render a scene with at least 3DoF based on 360-degree video received from the conference rooms.

The conference rooms 502 may comprise one or more user devices, for example one large display, for consumption of conversational video and/or audio of the media communication session. The remote participants 504, 506 may have user devices, for example a HMD and a 2D display device, for consumption of conversational video and/or audio of the media communication session.

A control device 508 may be provided as a middle-box between the conference rooms and the participants. An example of such a control device is a MRF/MCU connected to the conference rooms and the participants. The control device provides delivering the 360-degree video and conversational video and/or audio to user devices of the participants.

Viewport information is sent from the user devices of the remote participants 504, 506 to a source of the 360-degree content receive viewport-dependent video, in this case the middle-box. In this way the middle-box may send the user devices viewport dependent video streams for rendering at the user devices scenes based on a background of viewport dependent 360-degree video and an overlay of conversational video and/or audio.

Figure 6:
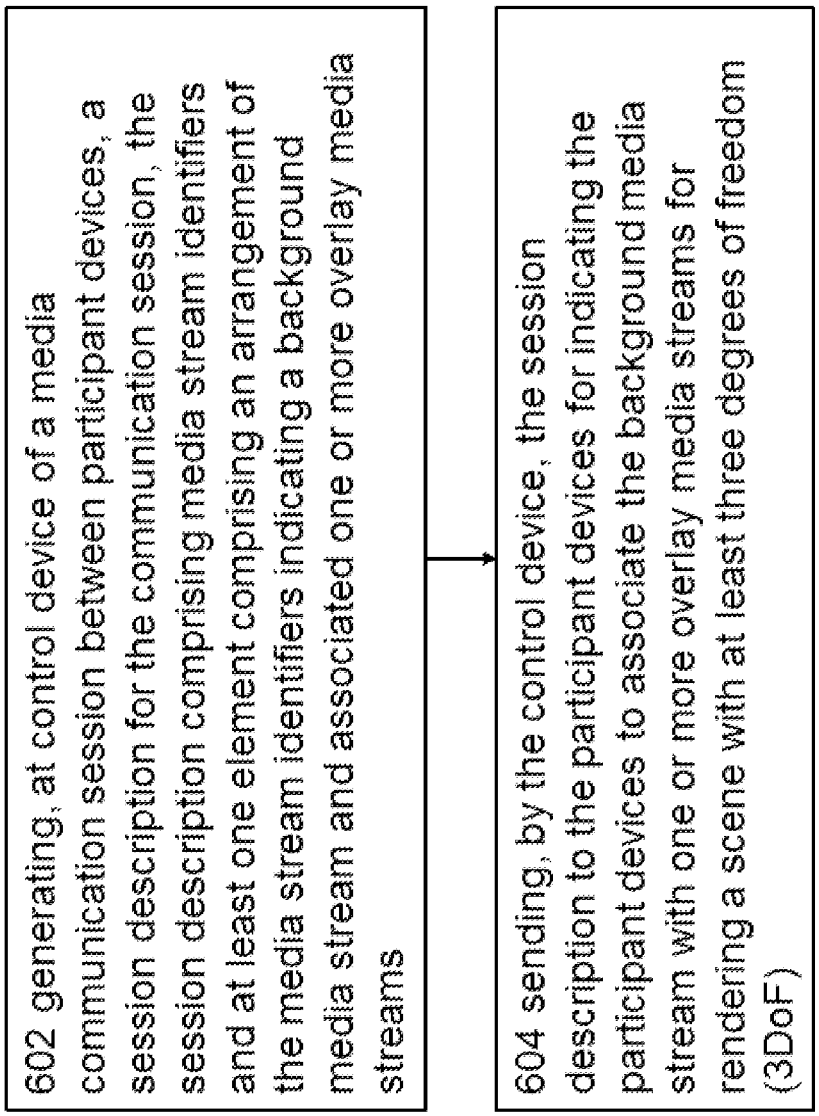
FIGS. 6 and 7 illustrate examples of methods in accordance with at least some embodiments of the present invention.

FIG. 6 illustrates an example of a method in accordance with at least some embodiments. The method supports indicating in a media communication session a capability of having an overlay media stream associated with a background media stream for rendering a scene with at least 3DoF and the scene comprising a background content and one or more associated overlay contents. The method may be performed by a control device of a media communication session.

Phase 602 comprises generating, at a control device of a media communication session between participant devices, a session description for the communication session, the session description comprising media stream identifiers and at least one element comprising an arrangement of the media stream identifiers indicating a background media stream and associated one or more overlay media streams.

Phase 604 comprises sending, by the control device, the session description to the participant devices for indicating the participant devices to associate the background media stream with one or more overlay media streams for rendering a scene with at least 3DoF.

In an example in accordance with at least some embodiments, phase 602 comprises determining based on positions of the background media stream and the overlay media streams within the arrangement, a synchronization source for rendering the scene.

In an example in accordance with at least some embodiments, phase 602 comprises determining one or more overlay attributes for the overlay media streams for controlling consumption of the overlay media streams during the media communication session, wherein an overlay attribute indicates at least one of
  size of an overlay media stream,
  position of an overlay media stream,
  movability of an overlay media stream, and
  enabling or disabling a presentation of an overlay media stream; and phase 602 comprises including the determined overlay attributes to the session description.

In an example in accordance with at least some embodiments, phase 602 comprises determining one or more background attributes for the background media streams for controlling playback modes of the background media streams during the media communication session, wherein a background attribute indicates at least one of
  a virtual reality playback mode for background media,
  an augmented reality playback mode for background media, and
  enabling or disabling presentation of background media; and phase 602 comprises including the determined background attributes to the session description.

In an example in accordance with at least some embodiments, phase 602 comprises determining on the basis of the media stream identifiers a plurality of elements for describing different arrangements of the media stream identifiers indicating a background media stream and associated one or more overlay media streams.

In an example in accordance with at least some embodiments, phase 602 comprises determining based on positions of the media stream identifiers within the arrangement, which of the media stream identifiers is for background and which of the media stream identifiers is for overlay in the scene. Accordingly, the media stream identifiers may be ordered, whereby one of the positions may be dedicated for indicating a media stream identifier of a synchronization source, i.e. a synchronization media stream. Alternatively or additionally, one of the positions may be dedicated for indicating a background media stream. The media stream identifier for indicating a background media stream may be e.g. the last or the first media stream identifiers on the line.

Figure 7:
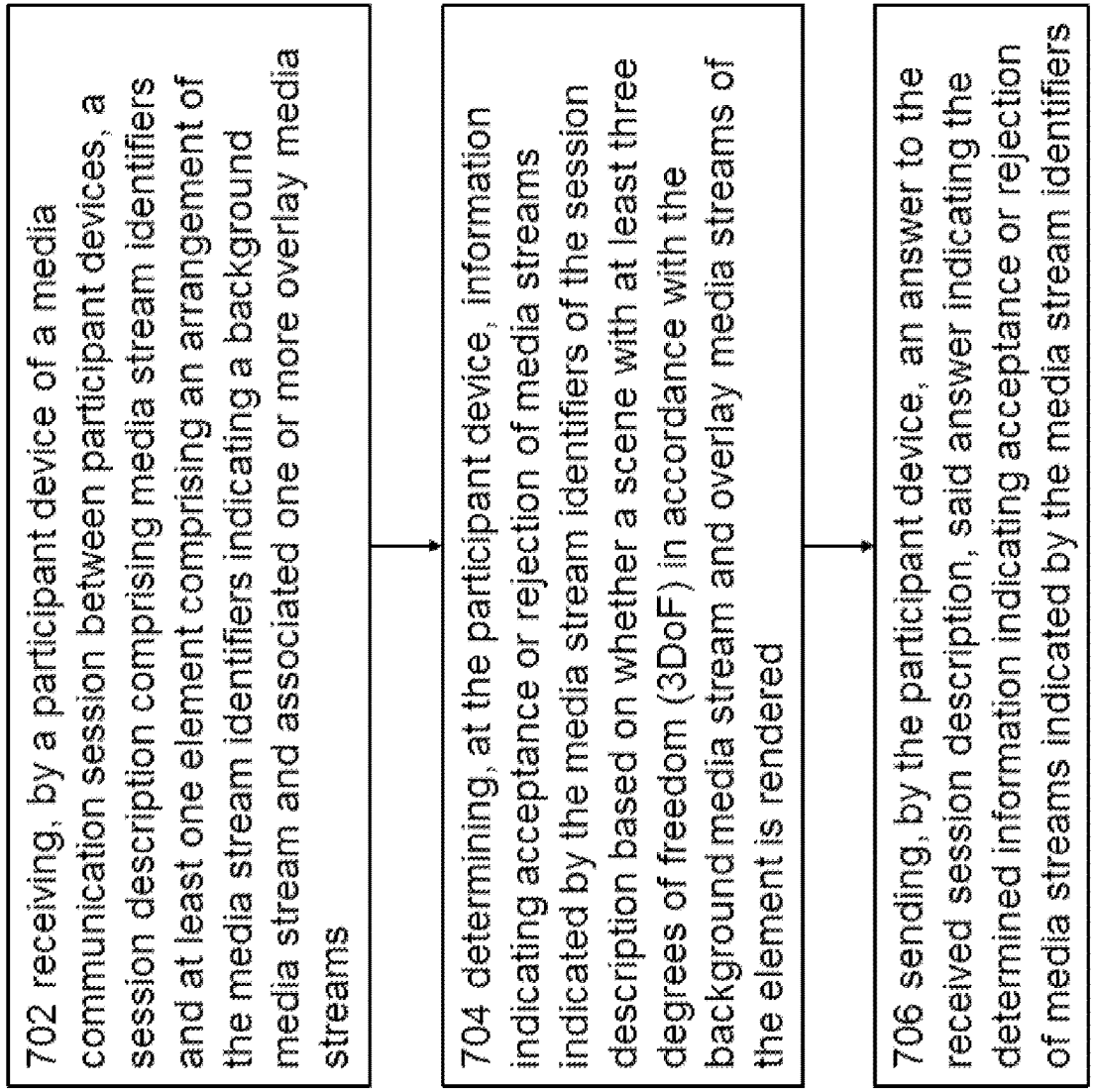

FIG. 7 illustrates an example of a method in accordance with at least some embodiments. The method supports detecting in a media communication session a capability of having an overlay media stream associated with a background media stream for rendering a scene with at least 3DoF and the scene comprising a background content and one or more associated overlay contents. The method may be performed by a participant device of a media communication session.

Phase 702 comprises receiving, by a participant device of a media communication session between participant devices, a session description comprising media stream identifiers and at least one element comprising an arrangement of the media stream identifiers indicating a background media stream and associated one or more overlay media streams.

Phase 704 comprises determining, at the participant device, information indicating acceptance or rejection of media streams indicated by the media stream identifiers of the session description based on a capability of the participant device to render a scene with at least 3DoF in accordance with the background media stream and overlay media streams of the element. In an example, a media stream may be accepted, when the participant device is capable of rendering the media stream. In an example, a media stream may be rejected, when the participant device is not capable of rendering the media stream. The information indicating an acceptance of a media stream may comprise a media stream identifier of the accepted media stream. The information indicating a rejection of a media stream may comprise a media stream identifier of the rejected media stream.

Phase 706 comprises sending, by the participant device, an answer to the received session description, said answer indicating the determined information indicating acceptance or rejection of media streams indicated by the media stream identifiers.

In an example phase 706 comprises the answer comprises at least media the stream identifiers of the element.

In an example in accordance with at least some embodiments, the session description received in phase 702 comprises more than one, i.e. two or more, i.e. elements that comprise arrangements of media stream identifiers, phase 704 comprises selecting, by the participant device one of the elements, and phase 706 comprises sending the answer comprising the media stream identifiers of the selected element. In this way acceptance of the media streams indicated by the media stream identifiers included in the selected element may be indicated.

In an example phase 704 comprises the participant device determining which media streams are needed from the media streams indicated by the session description received in phase 702. In an example, phase 706 comprises the participant device generating the answer, on the basis of the received session description, by the participant device retaining the media stream identifiers included in the selected element of media stream identifiers and removing media stream identifiers from the session description that are not included in the selected element. The retained media streams may be the media streams in accordance with the list of "mid" listed in a group identifier of the session description. The selected background media stream and the overlay streams are retained in the answer while the rest media streams, rejected ones, are dropped. In an example in accordance with at least some embodiments, phase 706 comprises receiving, by the participant device, in response to the answer, accepted media streams, and rendering the scene on the basis of the accepted media streams in accordance with the session description.

In an example in accordance with at least some embodiments, phase 702 comprises determining based on positions of the background media stream and the overlay media streams within the arrangement, a synchronization source for rendering the scene.

In an example in accordance with at least some embodiments, phase 702 comprises receiving, included to the session description, one or more overlay attributes for the overlay media streams, wherein an overlay attribute indicates at least one of size of an overlay media,
position of an overlay media,
movability of an overlay media, and
enabling or disabling a presentation of an overlay media; and phase 702 comprises controlling, based on the received overlay attributes, consumption of the overlay media streams during the media communication session.

In an example in accordance with at least some embodiments, phase 702 comprises receiving, by the participant device, included to the session description, one or more background attributes for the background media streams, wherein a background attribute indicates at least one of a virtual reality playback mode for background media,
an augmented reality playback mode for background media, and enabling or disabling presentation of background media; and phase 702 comprises controlling, based on the received background attributes, playback modes of the background media streams during the media communication session.

In an example in accordance with at least some embodiments, phase 702 comprises determining based on positions of the media stream identifiers within the arrangement, which of the media stream identifiers is for background and which of the media stream identifiers is for overlay in the scene.

Accordingly, the arrangement may comprise media stream identifiers that are ordered, whereby one of the positions may be dedicated for indicating a media stream identifier of a synchronization source, i.e. a synchronization media stream. Alternatively or additionally, one of the positions may be dedicated for indicating a background media stream. The media stream identifier for indicating a background media stream may be e.g. the last or the first media stream identifiers on the line.

Figure 8:
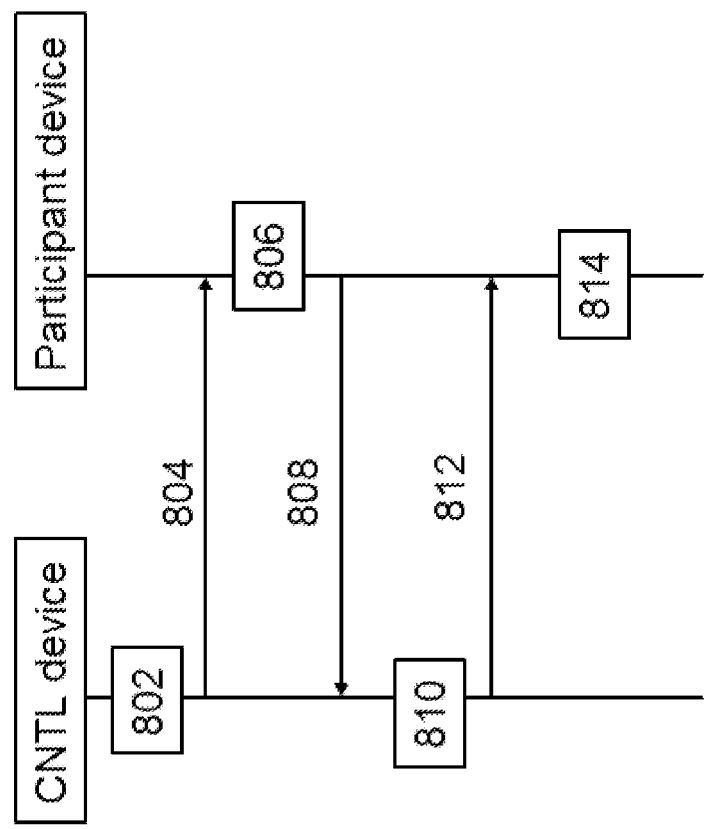
FIG. 8 illustrates an example of a sequence in accordance with at least some embodiments of the present invention.

FIG. 8 illustrates an example of a sequence in accordance with at least some embodiments of the present invention. The sequence supports rendering a scene with at least 3DoF comprising a background and one or more associated overlays.

Phase 802 comprises performing phase 602 in accordance with one or more of the examples described with FIG. 6.

Phase 804 comprises performing phase 604 in accordance with one or more of the examples described with FIG. 6.

Phase 806 comprises performing phases 702 and 704 in accordance with one or more of the examples described with FIG. 7.

Phase 808 comprises performing phase 706 in accordance with one or more of the examples described with FIG. 7.

Phase 810 comprises determining accepted media streams for the communication session on the basis of the answer received from the participant device.

Phase 812 comprises sending the determined accepted media streams to the participant device.

Phase 814 comprises receiving, by the participant device, in response to the answer, accepted media streams, and rendering, at the participant device, the scene on the basis of the accepted media streams in accordance with the session description.

In an example accordance with at least some embodiments of the present invention phase 814 comprises controlling rendering of the scene at the participant device. Controlling rendering of the scene may comprise controlling consumption of the overlay media streams and/or controlling playback modes of the background media stream during the media communication session on the basis of one or more attributes include in the session description.

An example in accordance with at least some embodiments comprises that a session description comprises a grouping of overlay and background media streams. This allows a receiver, e.g. a participant device, to select appropriate background and overlay media streams for rendering. Furthermore, the grouping semantics is extended to indicate which media stream is a synchronization source, i.e. anchor for synchronization, for the other media stream(s). In an example syntax for the session description provided below, the session description utilizes session attributes for indicating capability of having an overlay media stream associated with a background media stream for rendering a scene with at least 3DoF and the scene comprising a background content and one or more associated overlay contents. The session description may comprise an extension "OB" for a "group" attribute and media identifiers represented by "mid" in the session description may be ordered such that the first "mid" in the group defines the media stream that is the synchronization source. This is useful at least for inter-stream synchronization and Jitter Buffer Management implementation. The session description may comprise "ov_bg_pkg" attribute that indicates a type of stream packing which has been implemented for overlay and background delivery with value "packing_type" that is described in Table 1. The signaling of "ov_bg_pkg" without any explicit value, 0 or background could be assumed.

In different implementation embodiments, the background could be indicated as 1 whereas the foreground is indicated as 0. Signaling of ov_bg_pkg without any explicit value, the media stream could assumed to be foreground.

Example Syntax for Session Description:
v=0
o=Alice 2890844526 2890842807 IN IP4 131.163.72.4
s=360 VR conferencing
c=IN IP4 131.164.74.2
t=0 0
a=group:OB 3 1 2 //The grouping indicates that the background 3 is associated with overlay 1 and 2. In addition, the media stream 3 acts as anchor for synchronization.
m=video 49170 RTP/AVP 96
a=rtpmap:99 H264/90000
a=mid: 1
a=ov_bg_pkg:2
m=video 49172 RTP/AVP 97
a=rtpmap:99 H264/90000
a=mid: 2
a=ov_bg_pkg:2
m=video 49174 RTP/AVP 98
a=rtpmap:99 H264/90000
a=mid:3
a=ov_bg_pkg:0
m=video 49176 RTP/AVP 99
a=rtpmap:99 H264/90000
a=mid:4
a=ov_bg_pkg:0

TABLE 1

Media stream packing

| packing_type value | Semantic description |
| --- | --- |
| 0 | Only background |
| 2 | Only overlay |

Referring to Table 1 and the above example syntax, the session description defines that for media streams identified by "mid: 1" and "mid: 2" are for overlay and media streams identified by "mid: 3" and "mid: 4" are for background, based on their "packing_type" values.

An example in accordance with at least some embodiments comprises that a session description comprises overlay attributes for the overlay media streams for controlling consumption of the overlay media streams during the media communication session. An overlay attribute may comprise a media line attribute "3gpp_overlay_info" that indicates rendering characteristics of an overlay media stream. A media line following an overlay attribute may be determined to be an overlay. The absence of the overlay media attribute "3gpp_overlay_info" indicates that the media line is a background media stream. The "3gpp_overlay_info" attribute can have different values to indicate the different overlay rendering or interaction properties. Example syntax for a session description comprising overlay attributes is given below.

Example Syntax for a Session Description Comprising Overlay Attributes
v=0
o=Alice 2890844526 2890842807 IN IP4 131.163.72.4
s=360 VR conferencing
c=IN IP4 131.164.74.2
t=0 0
a=group:OB 1 2
m=video 49170 RTP/AVP 99
a=rtpmap:99 H264/90000
a=ov_bg_pkg:2
a=3gpp_overlay_info: <value>
a=mid: 1
m=video 49170 RTP/AVP 99
a=rtpmap:99 H264/90000
a=mid:2
a=ov_bg_pkg:0

TABLE 2

Media line attribute "3gpp_overlay_info"

| "3gpp_overlay_info:<value>" | Semantic description |
| --- | --- |
| 0 | Reserved |
| 1 | Viewport relative overlay and not movable, sender controls the position |
| 2 | Viewport relative, not movable and switchable (ON/OFF), sender controls the position |
| 3 | Viewport relative and movable, receiver can control the position, optionally further signaling needed to indicate initial position |
| 4 | Sphere relative overlay and not movable, sender controls the position |
| 5 | Sphere relative, not movable and switchable (ON/OFF), sender controls the position |

TABLE 2-continued

| Media line attribute "3gpp_overlay_info" | |
|---|---|
| "3gpp_overlay_info:<value>" | Semantic description |
| 6 | Sphere relative and movable, optionally further signaling needed to indicate initial position |

Referring to Table 2 the "3gpp_overlay_info" values provide controlling consumption of the overlay media streams during the media communication session. Accordingly, rendering of the scene with at least 3DoF, based on the media streams, may be controlled using the "3gpp_overlay_info" values. "Sphere relative" refers to rendering an overlay relative to a position relative to a scene. The scene may be e.g. a sphere. In this way the overlay may be consumed only, when viewport is directed to the position relative to the scene where the overlay is rendered. "Viewport relative" refers to rendering an overlay relative to a position relative to the viewport, whereby the overlay may be consumed regardless of the direction of the viewport in the scene. "switchable (ON/OFF)", may refer to enabling a participant device to switch off or switch on rendering of the overlay. "not movable" refers to the position of the overlay being fixed. On the other hand "movable" indicates that the position of the overlay in the scene may be changed. "sender" may refer to a participant device or omnidirectional video capture apparatus or a middle box (e.g. media gateway, MRF/MCU) and the "receiver" may refer to a participant device.

The sender, e.g. a control device or a participant device, may signal an overlay position with an attribute "overlay position" included in the session description which describes the center of the overlay azimuth and elevation on a sphere for sphere relative overlay. Signaling of the overlay position provides the sender to control rendering the overlay to a specific position, for example in "3gpp_overlay_info" for values, where the position is controlled/indicated. The sphere represents the omnidirectional background. For example, azimuth can be indicated in integers in the range 0-360 degrees and elevation can be indicated in integers in the range 0-180 degrees. In case of viewport relative overlays, the viewport position can be indicated with respect to the different positions on the viewport. The overlay information can also be signaled in-band with the video stream if it is expected to change frequently.

In an example, referring to Table 2, the "viewport relative" refers to rendering an overlay which is always locked to user's viewport. In other words, if the user is changing orientation of the HMD, the viewport orientation will change, and different content will be visible. However, if an overlay remains attached to user's viewport such that the background changes according to the head motion but the overlay remains locked to the same relative position of the viewport. Similarly, "sphere relative" refers to rendering an overlay which is locked to a fixed orientation of the background omnidirectional video. Consequently, a sphere relative overlay is visible to the user only if the user's orientation is such that the field of view or viewport extent overlaps with the overlay.

Referring the example syntax for a session description comprising overlay attributes and Tables 1 and 2, the media stream identified by "mid: 1" has empty value for "3gpp_overlay_info", whereby it may be determined that the media stream is a background media stream. The media stream identified by "mid: 1" is the synchronization source and the media stream identified by "mid: 2" is expected to use "mid:1" based on the order identifiers in the group attribute. The media stream identified by "mid: 2" is background based on the "packing_type" value '0'.

An example in accordance with at least some embodiments described with FIG. 6 comprises that a session description comprises background attributes for the background media streams for controlling playback modes of the background media streams during the media communication session. A background attribute may comprise a media line attribute "3gpp_background_info" that indicates rendering characteristics of a background media stream. The "3gpp_background_info" attribute can have different values for controlling playback modes of the background media streams during the media communication session. The background attribute may be particularly useful for facilitating augmented reality (AR) rendering. Example syntax for a session description comprising background attributes is given below.

Example Syntax for a Session Description Comprising Background Attributes is Given Below:

v=0
o=Alice 2890844526 2890842807 IN IP4 131.163.72.4
s=360 VR conferencing
c=IN IP4 131.164.74.2
t=0 0
a=group:OB 1 2
m=video 49170 RTP/AVP 99
a=rtpmap:99 H264/90000
a=ov_bg_pkg:2
a=3gpp_overlay_info: <value>
a=mid: 1
m=video 49170 RTP/AVP 99
a=rtpmap:99 H264/90000
a=mid:2
a=ov_bg_pkg:0
a=3gpp_background_info: <value>

TABLE 3

| Media line attribute "3gpp_background_info" | |
|---|---|
| "3gpp_background_info:<value>" | Semantic description |
| 0 | Background is sphere locked. The relative orientation of the background cannot be changed by the receiver UE. Consequently, the "front" is decided by the sender UE. Any region of omnidirectional sphere with missing content (i.e. less than omnidirectional content) is rendered as black pixels. Thus, it indicates recommendation for using a "VR mode". |
| 1 | Default ON and switchable (ON/OFF). This indicates that the background is ON by default and it can be switched off based on user interaction. |
| 2 | Default OFF and switchable (ON/OFF). This indicates that the background is OFF by default and it can be switched on based on user interaction. |
| 3 | Background is sphere locked with see-through for missing content in the omnidirectional sphere |

Referring the example syntax for a session description comprising background attributes and Tables 1, 2 and 3, the session description defines that the media stream identified by "mid: 2" is for background and the media stream identified by "mid: 1" is for overlay, based on their "packing_type" values. Based on the order of the identifiers in the "group" attribute, the media stream identified by "mid: 1" is the synchronization source for rendering the scene. Since the "3gpp_background_info" value is '0', the background is rendered in accordance with the semantic description for value '0' in Table 3.

Figure 9:
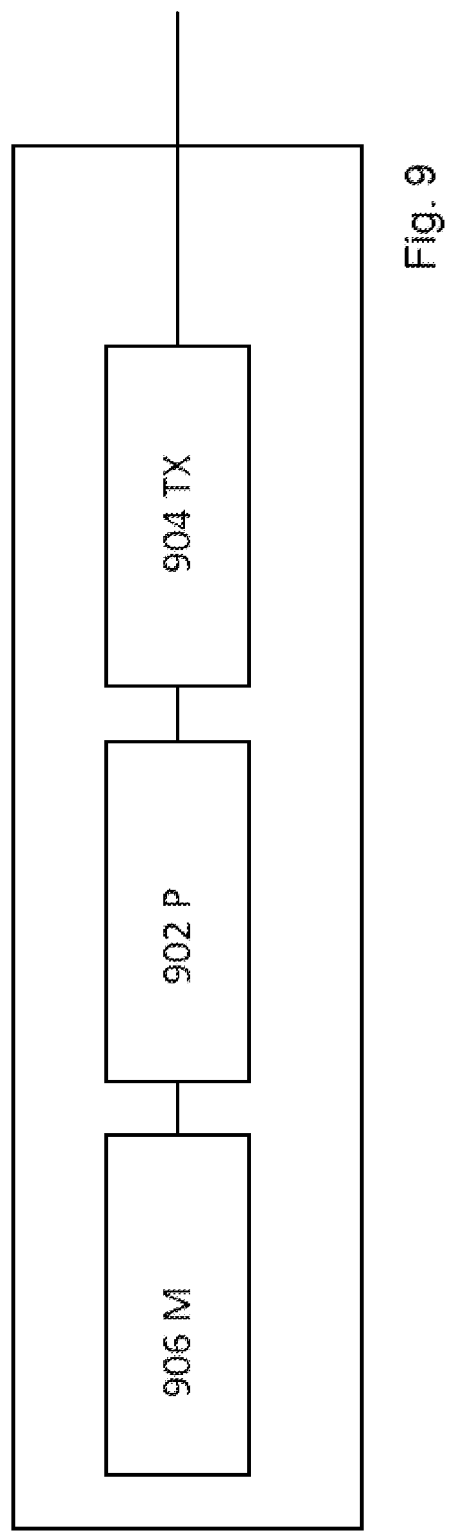
FIG. 9 illustrates an example of a block diagram of an apparatus in accordance with at least some embodiments of the present invention.

FIG. 9 illustrates an example of a block diagram of an apparatus in accordance with at least some embodiments of the present invention. The apparatus may be a participant device or a control device.

The apparatus comprises a processor (P) 902 and a transceiver (TX) 904. The processor is operatively connected to the transceiver for controlling the transceiver. The apparatus may comprise a memory (M) 906. The memory may be operatively connected to the processor. It should be appreciated that the memory may be a separate memory or included to the processor and/or the transceiver.

According to an embodiment, the processor is configured to control the transceiver to perform one or more functionalities described according to an embodiment.

Figure 10:
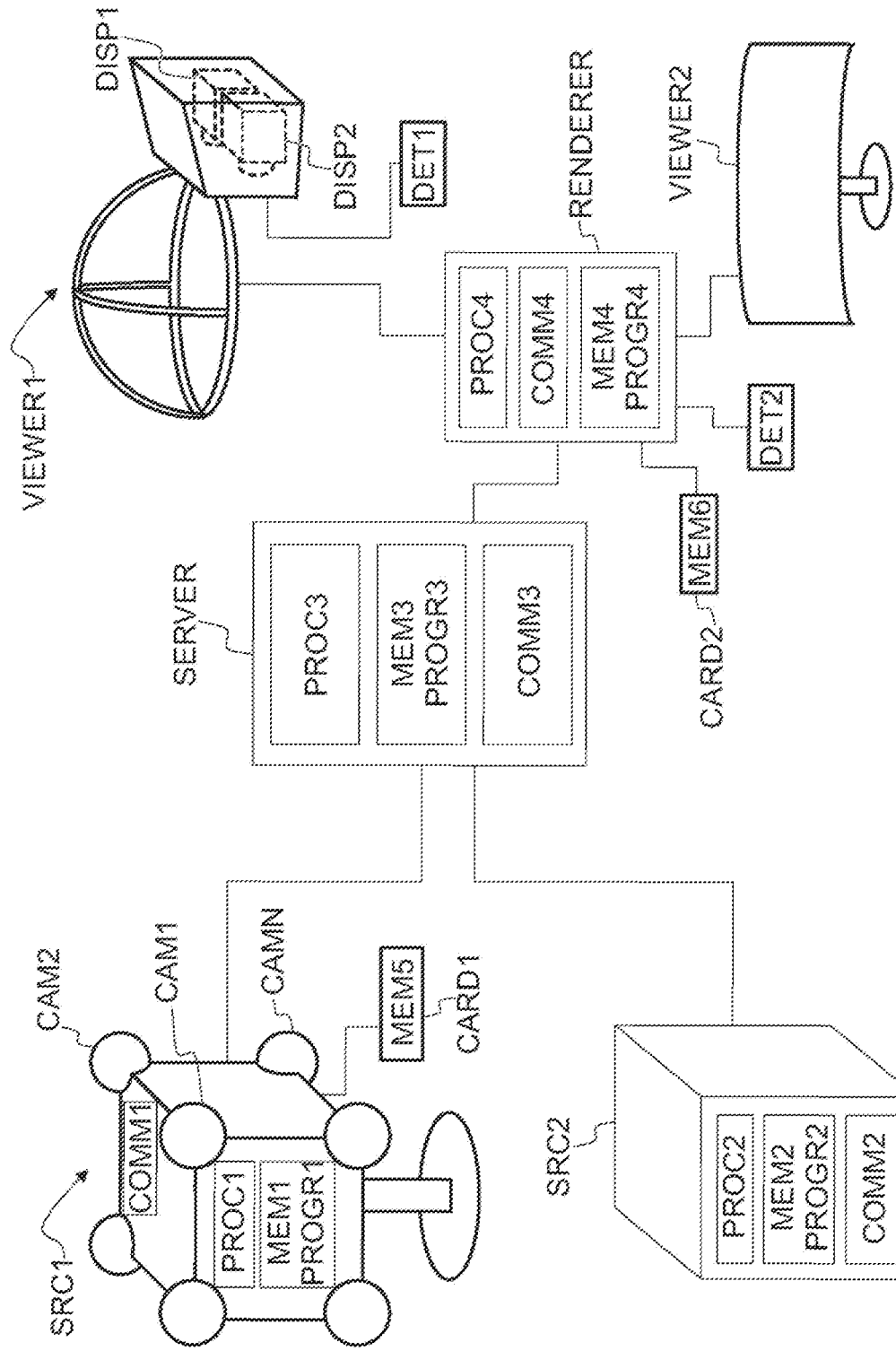
FIG. 10 shows a system for capturing, encoding, decoding, reconstructing and viewing a three-dimensional scheme in accordance with at least some embodiments of the present invention.

FIG. 10 shows a system for capturing, encoding, decoding, reconstructing and viewing a scene with at least 3DoF. The system or at least some parts of the system may be used in a communication session. The system is capable of capturing and encoding volumetric video and audio data for representing a scene with at least 3DoF which can be used as input for virtual reality (VR), augmented reality (AR) and mixed reality (MR) applications. The task of the system is that of capturing sufficient visual and optionally auditory information from a specific scene to be able to create a scene model such that a convincing reproduction of the experience, or presence, of being in that location can be achieved by one or more viewers physically located in different locations and optionally at a time later in the future.

The system of FIG. 10 may comprise three main parts: image/audio sources, a server and a rendering device. A video/audio source SRC1 may comprise multiple cameras CAM1, CAM2, . . . , CAMN with overlapping field of view so that regions of the view around the video capture device is captured from at least two cameras. The video/audio source SRC1 may comprise multiple microphones uP1, uP2, . . . , uPN to capture the timing and phase differences of audio originating from different directions. The video/audio source SRC1 may comprise a high-resolution orientation sensor so that the orientation (direction of view) of the plurality of cameras CAM1, CAM2, . . . , CAMN can be detected and recorded. The cameras or the computers may also comprise or be functionally connected to means for forming distance information corresponding to the captured images, for example so that the pixels have corresponding depth data. Such depth data may be formed by scanning the depth or it may be computed from the different images captured by the cameras. The video source SRC1 comprises or is functionally connected to, or each of the plurality of cameras CAM1, CAM2, . . . , CAMN comprises or is functionally connected to a computer processor and memory, the memory comprising computer program code for controlling the source and/or the plurality of cameras. The image stream captured by the video source, i.e. the plurality of the cameras, may be stored on a memory device for use in another device, e.g. a viewer, and/or transmitted to a server using a communication interface. It needs to be understood that although a video source comprising three cameras is described here as part of the system, another amount of camera devices may be used instead as part of the system.

It also needs to be understood that although microphones uP1 to uPN have been depicted along with cameras CAM1 to CAMN in FIG. 10 this does not need to be the case. For example, a possible scenario is that closeup microphones are used to capture audio sources at close proximity to obtain a dry signal of each source such that minimal reverberation and ambient sounds are included in the signal created by the closeup microphone source. The microphones co-located with the cameras can then be used for obtaining a wet or reverberant capture of the entire audio scene where the effect of the environment such as reverberation is captured as well. It is also possible to capture the reverberant or wet sound of single objects with such microphones if each source is active at a different time. Alternatively or in addition to, individual room microphones can be positioned to capture the wet or reverberant signal. Furthermore, each camera CAM1 through CAMN can comprise several microphones, such as two or 8 or any suitable number. There may also be additional microphone arrays which enable capturing spatial sound as first order ambisonics (FOA) or higher order ambisonics (HOA). As an example, a Sound Field microphone can be used.

One or more two-dimensional video bitstreams and one or more audio bitstreams may be computed at the server SERVER or a device RENDERER used for rendering, or another device at the receiving end. The devices SRC1 and SRC2 may comprise or be functionally connected to one or more computer processors (PROC2 shown) and memory (MEM2 shown), the memory comprising computer program (PROGR2 shown) code for controlling the source device SRC1/SRC2. The image/audio stream captured by the device may be stored on a memory device for use in another device, e.g. a viewer, or transmitted to a server or the viewer using a communication interface COMM2. There may be a storage, processing and data stream serving network in addition to the capture device SRC1. For example, there may be a server SERVER or a plurality of servers storing the output from the capture device SRC1 or device SRC2 and/or to form a visual and auditory scene model from the data from devices SRC1, SRC2. The device SERVER comprises or is functionally connected to a computer processor PROC3 and memory MEM3, the memory comprising computer program PROGR3 code for controlling the server. The device SERVER may be connected by a wired or wireless network connection, or both, to sources SRC1 and/or SRC2, as well as the viewer devices VIEWER1 and VIEWER2 over the communication interface COMM3.

For viewing and listening the captured or created video and audio content, there may be one or more reproduction devices REPROC1 and REPROC2. These devices may have a rendering module and a display and audio reproduction module, or these functionalities may be combined in a single device. The devices may comprise or be functionally connected to a computer processor PROC4 and memory MEM4, the memory comprising computer program PROG4 code for controlling the reproduction devices. The reproduction devices may consist of a video data stream receiver for receiving a video data stream and for decoding the video data stream, and an audio data stream receiver for receiving an audio data stream and for decoding the audio data stream. The video/audio data streams may be received from the server SERVER or from some other entity, such as a proxy server, an edge server of a content delivery network, or a file available locally in the viewer device. The data streams may be received over a network connection through communications interface COMM4, or from a memory device MEM6 like a memory card CARD2. The reproduction devices may have a graphics processing unit for processing of the data to a suitable format for viewing. The reproduction REPROC1 may comprise a high-resolution stereo-image head-mounted display for viewing the rendered stereo video sequence. The head-mounted display may have an orientation sensor DET1 and stereo audio headphones. The reproduction REPROC2 may comprise a display (either two-dimensional or a display enabled with 3D technology for displaying stereo video), and the rendering device may have an orientation detector DET2 connected to it. Alternatively, the reproduction REPROC2 may comprise a 2D display, since the volumetric video rendering can be done in 2D by rendering the viewpoint from a single eye instead of a stereo eye pair. The reproduction REPROC2 may comprise audio reproduction means, such as headphones or loudspeakers.

It needs to be understood that FIG. 10 depicts one SRC1 device and one SRC2 device, but generally the system may comprise more than one SRC1 device and/or SRC2 device.

The present embodiments relate to signaling for communications sessions for controlling rendering of a scene with at least 3DoF. A session description of a communications session may comprise identifiers of a background media stream and associated one or more overlay media streams, whereby the media streams may be selected and consumed during the communication session in a scene rendered by a viewer device. The rendered scene may be an augmented reality (AR), a virtual reality (VR) or a mixed reality (MR) scene with at least 3DoF.

In an example in accordance with at least some embodiments, rendering of the scene may be modified on the basis of detecting a change of the viewport. The viewport of the scene may change, e.g. by a movement of the viewer device. In an example, the movement may comprise a yaw/pitch/roll of the viewer device. The viewer device may comprise sensors for detecting the movement of the viewer device. Examples of the sensors comprise inertial sensors such as a gyroscope or image/vision based motion sensing devices.

FIG. 11 illustrates an example of a block diagram of an apparatus or a part of the apparatus in accordance with at least some embodiments of the present invention. The apparatus may be e.g. a communications device, wireless device, user device, viewer device, head-mounted-display (HMD), mobile terminal or user equipment of a wireless communication system. The apparatus is illustrated by functional blocks that may be implemented by at least one processor and at least one memory. The memory may store computer program code to cause one or more functionalities described in accordance with one or more embodiments described herein, when the computer program code is executed by the processor. The functional blocks comprise a Viewport Change Detector (VCD) 1102 and a Scene Tracker (ST) 1104. The VCD may determine a viewport change and the ST may cause rendering of a scene with at least 3DoF based on the changed viewport. An example of a change of the viewport is a change of yaw, pitch and/or roll of HMD that is rendering the scene. The ST may cause rendering the scene on the basis of a yaw, pitch and/or roll of the HMD in response to the ST receiving information from the VCD which indicates that the VCD has detected a change of the yaw, pitch and/or roll of the HMD. The ST may output information that may indicate to a device used for rendering the scene that the scene should be rendered on the basis of a changed yaw, pitch and/or roll. In an example the ST may output a yaw, pitch and/or roll for rendering the scene. In an example the device for rendering may retrieve a yaw, pitch and/or roll for rendering the ST. In this way the scene rendered by the HMD may be kept updated on changes of the yaw, pitch and/or roll.

A memory may be a computer readable medium that may be non-transitory. The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi-core processor architecture, as non-limiting examples.

Embodiments may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any media or means that can contain, store, communicate, propagate or transport the instructions for use by or in connection with an instruction execution system, apparatus, or device, such as a computer.

Reference to, where relevant, "computer-readable storage medium", "computer program product", "tangibly embodied computer program" etc., or a "processor" or "processing circuitry" etc. should be understood to encompass not only computers having differing architectures such as single/multi-processor architectures and sequencers/parallel architectures, but also specialized circuits such as field programmable gate arrays FPGA, application specific circuits ASIC, signal processing devices and other devices. References to computer readable program code means, computer program, computer instructions, computer code etc. should be understood to express software for a programmable processor firmware such as the programmable content of a hardware device as instructions for a processor or configured or configuration settings for a fixed function device, gate array, programmable logic device, etc.

Although the above examples describe embodiments of the invention operating within an apparatus, electronic device, a participant device, communications device, wireless device, viewer device, server, control device, MRF/MCU, user device, head-mounted-display (HMD), mobile terminal or user equipment or control device, it would be appreciated that the invention as described above may be implemented as a part of any apparatus comprising a circuitry for processing messages for communication sessions. Thus, for example, embodiments of the invention may be implemented in a mobile phone, in a computer such as a desktop computer or a tablet computer comprising radio frequency communication means (e.g. wireless local area network, cellular radio, etc.).

In general, the various embodiments of the invention may be implemented in hardware or special purpose circuits or any combination thereof. While various aspects of the invention may be illustrated and described as block diagrams or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following:
(a) hardware-only circuit implementations (such as implementations in only analogue and/or digital circuitry) and
(b) combinations of hardware circuits and software, such as (as applicable):
(i) a combination of analogue and/or digital hardware circuit(s) with software/firmware and
(ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

Acronyms
2D Two-dimensional
2G Second generation communication technology
3DoF Three degrees of freedom
3G Third generation communication technology
4G Fourth generation communication technology
5G Fifth generation communication technology
AR Augmented Reality
ARM Advanced RISC Machine
ASIC Application Specific Circuits
CPU Central Processing Unit
CDMA Code Division Multiple Access
DoF Degrees of Freedom
DSP Digital Signal Processors
FDMA Frequency Division Multiple Access
FPGA Field Programmable Gate Arrays
GSM global systems for mobile communications
HMD Head Mounted Display
HSDPA High-Speed Downlink Packet Access
HSUPA High-speed Uplink Packet Access
HTTP HyperText Transfer Protocol
IMD Integrated Messaging Device
IMS Instant Messaging Service
IP Internet Protocol
ISO International Organization for Standardization
LTE Long Term Evolution
LTE-A LTE Advanced
M Memory
mid media stream identifier
MMS Multimedia Messaging Service
MPEG Moving Picture Experts Group
MPEG-DASH MPEG Dynamic Adaptive Streaming over HTTP DASH
MR Mixed Reality
MRF/MCU Multimedia Resource Function/Multipoint Control unit
OSI Open Systems Interconnection
P Processor
PDA Personal Digital Assistant
RISC Reduced Instruction Set Computer
RTP/RTCP Real-Time Transport Protocol/Real-time Transport Control Protocol
SMS Short Messaging Service
SIP/SDP Session Initiation Protocol/Session Description Protocol
ST Scene Tracker
TDMA Time Divisional multiple Access
TX Transceiver
UICC Universal Integrated Circuit Card
UMTS Universal Mobile Telecommunications System
VCD Viewport Change Detector
VR Virtual Reality Examples 1 to 50

1. A method, comprising:
    generating, at a control device of a media communication session between participant devices, a session description for the communication session, the session description comprising media stream identifiers and at least one element comprising an arrangement of the media stream identifiers indicating a background media stream and associated one or more overlay media streams; and
    sending, by the control device, the session description to the participant devices for indicating the participant devices to associate the background media stream with one or more overlay media streams for rendering a scene with at least three degrees of freedom (3DoF).
2. The method according to example 1, comprising:
    determining based on positions of the background media stream and the overlay media streams within the arrangement, a synchronization source for rendering the scene.
3. The method according to example 1 or 2, comprising:
    determining one or more overlay attributes for the overlay media streams for controlling consumption of the overlay media streams during the media communication session, wherein an overlay attribute indicates at least one of
        size of an overlay media stream,
        position of an overlay media stream,
        movability of an overlay media stream, and
        enabling or disabling a presentation of an overlay media stream;
    including the determined overlay attributes to the session description.
4. The method according to any of the preceding examples, comprising:
    determining one or more background attributes for the background media streams for controlling playback modes of the background media streams during the media communication session, wherein a background attribute indicates at least one of
- a virtual reality playback mode for background media,
- an augmented reality playback mode for background media, and
- enabling or disabling presentation of background media; and including the determined background attributes to the session description.

5. The method according to any of the preceding examples, comprising:
determining on the basis of the media stream identifiers a plurality of elements for describing different arrangements of the media stream identifiers indicating a background media stream and associated one or more overlay media streams.

6. A method comprising:
receiving, by a participant device of a media communication session between participant devices, a session description comprising media stream identifiers and at least one element comprising an arrangement of the media stream identifiers indicating a background media stream and associated one or more overlay media streams;
determining, at the participant device, information indicating acceptance or rejection of media streams indicated by the media stream identifiers of the session description based on whether a scene with at least three degrees of freedom (3DoF) in accordance with the background media stream and overlay media streams of the element is rendered; and
sending, by the participant device, an answer to the received session description, said answer indicating the determined information indicating acceptance or rejection of media streams indicated by the media stream identifiers.

7. The method according to example 6, comprising:
receiving, by the participant device, in response to the answer, accepted media streams; and
rendering the scene on the basis of the accepted media streams in accordance with the session description.

8. The method according to example 6 or 7, comprising:
determining based on positions of the background media stream and the overlay media streams within the arrangement, a synchronization source for rendering the scene.

9. The method according to any of examples 6 to 8, comprising
receiving, by the participant device, included to the session description, one or more overlay attributes for the overlay media streams, wherein an overlay attribute indicates at least one of
- size of an overlay media,
- position of an overlay media,
- movability of an overlay media, and
- enabling or disabling a presentation of an overlay media;

controlling, based on the received overlay attributes, consumption of the overlay media streams during the media communication session.

10. The method according to any of examples 6 to 9, comprising
receiving, by the participant device, included to the session description, one or more background attributes for the background media streams, wherein a background attribute indicates at least one of
- a virtual reality playback mode for background media,
- an augmented reality playback mode for background media, and
- enabling or disabling presentation of background media; and controlling, based on the received background attributes, playback modes of the background media streams during the media communication session.

11. An apparatus comprising:
means for generating, at a control device of a media communication session between participant devices, a session description for the communication session, the session description comprising media stream identifiers and at least one element comprising an arrangement of the media stream identifiers indicating a background media stream and associated one or more overlay media streams; and
means for sending, by the control device, the session description to the participant devices for indicating the participant devices to associate the background media stream with one or more overlay media streams for rendering a scene with at least three degrees of freedom (3DoF).

12. The apparatus according to example 11, comprising:
means for determining based on positions of the background media stream and the overlay media streams within the arrangement, a synchronization source for rendering the scene.

13. The apparatus according to example 11 or 12, comprising:
means for determining one or more overlay attributes for the overlay media streams for controlling consumption of the overlay media streams during the media communication session, wherein an overlay attribute indicates at least one of
- size of an overlay media stream,
- position of an overlay media stream,
- movability of an overlay media stream, and
- enabling or disabling a presentation of an overlay media stream;

means for including the determined overlay attributes to the session description.

14. The apparatus according to any of examples 11 to 13, comprising:
means for determining one or more background attributes for the background media streams for controlling playback modes of the background media streams during the media communication session, wherein a background attribute indicates at least one of
- a virtual reality playback mode for background media,
- an augmented reality playback mode for background media, and
- enabling or disabling presentation of background media; and means for including the determined background attributes to the session description.

15. The apparatus according to any of examples 11 to 14, comprising:
means for determining on the basis of the media stream identifiers a plurality of elements for describing different arrangements of the media stream identifiers indicating a background media stream and associated one or more overlay media streams.

16. An apparatus comprising:
   means for receiving, by a participant device of a media communication session between participant devices, a session description comprising media stream identifiers and at least one element comprising an arrangement of the media stream identifiers indicating a background media stream and associated one or more overlay media streams;
   means for determining, at the participant device, information indicating acceptance or rejection of media streams indicated by the media stream identifiers of the session description based on whether a scene with at least three degrees of freedom (3DoF) in accordance with the background media stream and overlay media streams of the element is rendered; and
   means for sending, by the participant device, an answer to the received session description, said answer indicating the determined information indicating acceptance or rejection of media streams indicated by the media stream identifiers.

17. The apparatus according to example 16, comprising:
   means for receiving, by the participant device, in response to the answer, accepted media streams; and
   means for rendering the scene on the basis of the accepted media streams in accordance with the session description.

18. The apparatus according to example 16 or 17, comprising:
   means for determining based on positions of the background media stream and the overlay media streams within the arrangement, a synchronization source for rendering the scene.

19. The apparatus according to any of examples 16 to 18, comprising
   means for receiving, by the participant device, included to the session description, one or more overlay attributes for the overlay media streams, wherein an overlay attribute indicates at least one of
   size of an overlay media,
   position of an overlay media,
   movability of an overlay media, and
   enabling or disabling a presentation of an overlay media;
   means for controlling, based on the received overlay attributes, consumption of the overlay media streams during the media communication session.

20. The apparatus according to any of examples 16 to 19, comprising
   means for receiving, by the participant device, included to the session description, one or more background attributes for the background media streams, wherein a background attribute indicates at least one of
   a virtual reality playback mode for background media,
   an augmented reality playback mode for background media, and
   enabling or disabling presentation of background media; and
   means for controlling, based on the received background attributes, playback modes of the background media streams during the media communication session.

21. An apparatus comprising at least one processor and at least one memory, said at least one memory stored with computer program code thereon, the at least one memory and the computer program code configured to, with the at least one processor, cause the apparatus at least to:
   generate, at a control device of a media communication session between participant devices, a session description for the communication session, the session description comprising media stream identifiers and at least one element comprising an arrangement of the media stream identifiers indicating a background media stream and associated one or more overlay media streams; and
   send, by the control device, the session description to the participant devices for indicating the participant devices to associate the background media stream with one or more overlay media streams for rendering a scene with at least three degrees of freedom (3DoF).

22. The apparatus according to example 21, caused to:
   determine based on positions of the background media stream and the overlay media streams within the arrangement, a synchronization source for rendering the scene.

23. The apparatus according to example 21 or 22, caused to:
   determine one or more overlay attributes for the overlay media streams for controlling consumption of the overlay media streams during the media communication session, wherein an overlay attribute indicates at least one of
   size of an overlay media stream,
   position of an overlay media stream,
   movability of an overlay media stream, and
   enabling or disabling a presentation of an overlay media stream;
   include the determined overlay attributes to the session description.

24. The apparatus according to any of examples 21 to 23, caused to:
   determine one or more background attributes for the background media streams for controlling playback modes of the background media streams during the media communication session, wherein a background attribute indicates at least one of
   a virtual reality playback mode for background media,
   an augmented reality playback mode for background media, and
   enabling or disabling presentation of background media; and
   include the determined background attributes to the session description.

25. The apparatus according to any of examples 21 to 24, caused to:
   determine on the basis of the media stream identifiers a plurality of elements for describing different arrangements of the media stream identifiers indicating a background media stream and associated one or more overlay media streams.

26. An apparatus comprising at least one processor and at least one memory, said at least one memory stored with computer program code thereon, the at least one memory and the computer program code configured to, with the at least one processor, cause the apparatus at least to:
   receive, by a participant device of a media communication session between participant devices, a session description comprising media stream identifiers and at least one element comprising an arrangement of the media stream identifiers indicating a background media stream and associated one or more overlay media streams;

determine, at the participant device, information indicating acceptance or rejection of media streams indicated by the media stream identifiers of the session description based on whether a scene with at least three degrees of freedom (3DoF) in accordance with the background media stream and overlay media streams of the element is rendered; and send, by the participant device, an answer to the received session description, said answer indicating the determined information indicating acceptance or rejection of media streams indicated by the media stream identifiers.

27. The apparatus according to example 26, comprising:
receive, by the participant device, in response to the answer, accepted media streams; and
render the scene on the basis of the accepted media streams in accordance with the session description.

28. The apparatus according to example 26 or 27, caused to:
determine based on positions of the background media stream and the overlay media streams within the arrangement, a synchronization source for rendering the scene.

29. The apparatus according to any of examples 26 to 28, caused to
receive, by the participant device, included to the session description, one or more overlay attributes for the overlay media streams, wherein an overlay attribute indicates at least one of
size of an overlay media,
position of an overlay media,
movability of an overlay media, and
enabling or disabling a presentation of an overlay media;
control, based on the received overlay attributes, consumption of the overlay media streams during the media communication session.

30. The apparatus according to any of examples 26 to 29, caused to
receive, by the participant device, included to the session description, one or more background attributes for the background media streams, wherein a background attribute indicates at least one of
a virtual reality playback mode for background media,
an augmented reality playback mode for background media, and
enabling or disabling presentation of background media; and
control, based on the received background attributes, playback modes of the background media streams during the media communication session.

31. A computer program comprising computer readable program code means adapted to perform at least the following:
generating, at a control device of a media communication session between participant devices, a session description for the communication session, the session description comprising media stream identifiers and at least one element comprising an arrangement of the media stream identifiers indicating a background media stream and associated one or more overlay media streams; and sending, by the control device, the session description to the participant devices for indicating the participant devices to associate the background media stream with one or more overlay media streams for rendering a scene with at least three degrees of freedom (3DoF).

32. The computer program according to example 31, comprising:
determining based on positions of the background media stream and the overlay media streams within the arrangement, a synchronization source for rendering the scene.

33. The computer program according to example 31 or 32, comprising computer readable program code means adapted to perform:
determining one or more overlay attributes for the overlay media streams for controlling consumption of the overlay media streams during the media communication session, wherein an overlay attribute indicates at least one of
size of an overlay media stream,
position of an overlay media stream,
movability of an overlay media stream, and
enabling or disabling a presentation of an overlay media stream;
including the determined overlay attributes to the session description.

34. The computer program according to any of examples 31 to 33, comprising computer readable program code means adapted to perform:
determining one or more background attributes for the background media streams for controlling playback modes of the background media streams during the media communication session, wherein a background attribute indicates at least one of
a virtual reality playback mode for background media,
an augmented reality playback mode for background media, and
enabling or disabling presentation of background media; and
including the determined background attributes to the session description.

35. The computer program according to any of examples 31 to 34, comprising computer readable program code means adapted to perform:
determining on the basis of the media stream identifiers a plurality of elements for describing different arrangements of the media stream identifiers indicating a background media stream and associated one or more overlay media streams.

36. A computer program comprising computer readable program code means adapted to perform at least the following: receiving, by a participant device of a media communication session between participant devices, a session description comprising media stream identifiers and at least one element comprising an arrangement of the media stream identifiers indicating a background media stream and associated one or more overlay media streams;
determining, at the participant device, information indicating acceptance or rejection of media streams indicated by the media stream identifiers of the session description based on whether a scene with at least three degrees of freedom (3DoF) in accordance with the background media stream and overlay media streams of the element is rendered; and sending, by the participant device, an answer to the received session description, said answer indicating the determined information indicating acceptance or rejection of media streams indicated by the media stream identifiers.

37. The computer program according to example 36, comprising computer readable program code means adapted to perform:
receiving, by the participant device, in response to the answer, accepted media streams; and
rendering the scene on the basis of the accepted media streams in accordance with the session description.

38. The computer program according to example 36 or 37, comprising computer readable program code means adapted to perform:
determining based on positions of the background media stream and the overlay media streams within the arrangement, a synchronization source for rendering the scene.

39. The computer program according to any of examples 36 to 38, comprising computer readable program code means adapted to perform:
receiving, the participant device, included to the session description, one or more overlay attributes for the overlay media streams, wherein an overlay attribute indicates at least one of
size of an overlay media,
position of an overlay media,
movability of an overlay media, and
enabling or disabling a presentation of an overlay media;
controlling, based on the received overlay attributes, consumption of the overlay media streams during the media communication session.

40. The computer program according to any of examples 36 to 39, comprising computer readable program code means adapted to perform:
receiving, by the participant device, included to the session description, one or more background attributes for the background media streams, wherein a background attribute indicates at least one of
a virtual reality playback mode for background media,
an augmented reality playback mode for background media, and
enabling or disabling presentation of background media; and
controlling, based on the received background attributes, playback modes of the background media streams during the media communication session.

41. A non-transitory computer readable medium comprising program instructions stored thereon for performing at least the following:
generating, at a control device of a media communication session between participant devices, a session description for the communication session, the session description comprising media stream identifiers and at least one element comprising an arrangement of the media stream identifiers indicating a background media stream and associated one or more overlay media streams; and
sending, by the control device, the session description to the participant devices for indicating the participant devices to associate the background media stream with one or more overlay media streams for rendering a scene with at least three degrees of freedom (3DoF).

42. The non-transitory computer readable medium according to example 41, comprising program instructions stored thereon for performing:
determining based on positions of the background media stream and the overlay media streams within the arrangement, a synchronization source for rendering the scene.

43. The non-transitory computer readable medium according to example 41 or 42, comprising program instructions stored thereon for performing:
determining one or more overlay attributes for the overlay media streams for controlling consumption of the overlay media streams during the media communication session, wherein an overlay attribute indicates at least one of
size of an overlay media stream,
position of an overlay media stream,
movability of an overlay media stream, and
enabling or disabling a presentation of an overlay media stream;
including the determined overlay attributes to the session description.

44. The non-transitory computer readable medium according to any of examples 41 to 44, comprising program instructions stored thereon for performing:
determining one or more background attributes for the background media streams for controlling playback modes of the background media streams during the media communication session, wherein a background attribute indicates at least one of
a virtual reality playback mode for background media,
an augmented reality playback mode for background media, and
enabling or disabling presentation of background media; and
including the determined background attributes to the session description.

45. The non-transitory computer readable medium according to any of examples 41 to 44, comprising program instructions stored thereon for performing:
determining on the basis of the media stream identifiers a plurality of elements for describing different arrangements of the media stream identifiers indicating a background media stream and associated one or more overlay media streams.

46. A non-transitory computer readable medium comprising program instructions stored thereon for performing at least the following: receiving, by a participant device of a media communication session between participant devices, a session description comprising media stream identifiers and at least one element comprising an arrangement of the media stream identifiers indicating a background media stream and associated one or more overlay media streams;
determining, at the participant device, information indicating acceptance or rejection of media streams indicated by the media stream identifiers of the session description based on whether a scene with at least three degrees of freedom (3DoF) in accordance with the background media stream and overlay media streams of the element is rendered; and
sending, by the participant device, an answer to the received session description, said answer indicating the determined information indicating acceptance or rejection of media streams indicated by the media stream identifiers.

47. The non-transitory computer readable medium according to example 46, comprising program instructions stored thereon for performing:
  receiving, by the participant device, in response to the answer, accepted media streams; and
  rendering the scene on the basis of the accepted media streams in accordance with the session description.

48. The non-transitory computer readable medium according to example 46 or 47, comprising program instructions stored thereon for performing:
  determining based on positions of the background media stream and the overlay media streams within the arrangement, a synchronization source for rendering the scene.

49. The non-transitory computer readable medium according to any of examples 46 to 48, comprising program instructions stored thereon for performing:
  receiving, by the participant device, included to the session description, one or more overlay attributes for the overlay media streams, wherein an overlay attribute indicates at least one of
  size of an overlay media,
  position of an overlay media,
  movability of an overlay media, and
  enabling or disabling a presentation of an overlay media;
  controlling, based on the received overlay attributes, consumption of the overlay media streams during the media communication session.

50. The non-transitory computer readable medium according to any of examples 46 to 49, comprising program instructions stored thereon for performing:
  receiving, by the participant device, included to the session description, one or more background attributes for the background media streams, wherein a background attribute indicates at least one of
  a virtual reality playback mode for background media,
  an augmented reality playback mode for background media, and
  enabling or disabling presentation of background media; and
  controlling, based on the received background attributes, playback modes of the background media streams during the media communication session.

The invention claimed is:

1. An apparatus comprising:
at least one processor; and
at least one memory storing instructions that, when executed with the at least one processor, cause the apparatus to:
  generate, at a control device of a media communication session between participant devices, a session description for the media communication session, the session description comprising media stream identifiers and at least one element comprising an arrangement of the media stream identifiers indicating a background media stream and associated one or more overlay media streams; and
  send, with the control device, the session description to the participant devices the for indicating participant devices to associate the background media stream with one or more overlay media streams for rendering a scene with at least three degrees of freedom (3DoF).

2. The apparatus according to claim 1, where the instructions, when executed with the at least one processor, cause the apparatus to:
  determine based on positions of the background media stream and the one or more overlay media streams within the arrangement, a synchronization source for rendering the scene.

3. The apparatus according to claim 1, where the instructions, when executed with the at least one processor, cause the apparatus to:
  determine one or more overlay attributes for the one or more overlay media streams for controlling consumption of the one or more overlay media streams during the media communication session, wherein an overlay attribute indicates at least one of size of
  an overlay media stream,
  position of the overlay media stream,
  movability of the overlay media stream, or
  enabling or disabling a presentation of the overlay media stream; and
  include the determined overlay attributes to the session description.

4. The apparatus according to claim 1, where the instructions, when executed with the at least one processor, cause the apparatus to:
  determine one or more background attributes for the background media stream for controlling playback modes of the background media streams during the media communication session, wherein a background attribute indicates at least one of
  a virtual reality playback mode for the background media stream,
  an augmented reality playback mode for the background media stream, or
  enabling or disabling presentation of the background media stream; and
  include the determined background attributes to the session description.

5. The apparatus according to claim 1, where the instructions, when executed with the at least one processor, cause the apparatus to:
  determine on the basis of the media stream identifiers a plurality of elements for describing different arrangements of the media stream identifiers indicating a background media stream and associated one or more overlay media streams.

6. A method comprising:
  generating, at a control device of a media communication session between participant devices, a session description for the media communication session, the session description comprising media stream identifiers and at least one element comprising an arrangement of the media stream identifiers indicating a background media stream and associated one or more overlay media streams; and
  sending, with the control device, the session description to the participant devices for indicating the participant devices to associate the background media stream with one or more overlay media streams for rendering a scene with at least three degrees of freedom (3DoF).

7. The method according to claim 6, comprising:
  determining based on positions of the background media stream and the overlay media streams within the arrangement, a synchronization source for rendering the scene.

8. The method according to claim 6, comprising:
  determining one or more overlay attributed for the overlay media streams for controlling consumption of the overlay media streams during the media communication session, wherein an overlay attribute indicates at least one of:
size of an overlay media stream,
position of the overlay media stream,
movability of the overlay media stream, or
enabling or disabling a presentation of the overlay media stream; and
include the determined overlay attributed to the session description.

9. The method according to claim 6, comprising:
determining one r more background attributed for the background media stream for controlling playback modes of the background media stream during the media communication session, wherein a background attribute indicates at least one of:
a virtual reality playback mode for the background media stream,
an augmented reality playback mode for the background media stream, or
enabling or disabling presentation of the background media stream; and
including the determined background attributed to the session description.

10. The method according to claim 6, comprising:
determining on the basis of the media stream identifiers a plurality of elements for describing different arrangements of the media stream identifiers indicating a background media stream and associated one or more overlay media streams.

11. The method according to claim 8, comprising:
receiving, with the participant device, in response to the answer, accepted media streams; and
rendering, at the participant device, the scene on the basis of the accepted media streams in accordance with the session description.

12. The method according to claim 8, comprising:
determining based on positions of the background media stream and the overlay media streams within the arrangement, a synchronization source for rendering the scene.

13. The method according to claim 8, comprising:
receiving, with the participant device, included to the session description, one or more overlay attributes for the overlay media streams, wherein an overlay attribute indicates at least one of:
size of an overlay media,
position of the overlay media,
movability of the overlay media, or
enabling or disabling a presentation of the overlay media; and
controlling, based on the received overlay attributes, consumption of the overlay media streams during the media communication session.

14. The method according to claim 8, comprising:
receiving, with the participant device, included to the session description, one or more background attributes for the background media stream, wherein a background attribute indicates at least one of:
a virtual reality playback mode for the background media,
an augmented reality playback mode for the background media, or
enabling or disabling a of the background media; and
controlling, based on the received background attributes, playback modes of the background media stream during the media communication session.

\* \* \* \* \*